3,293,946
SEMI-AUTOMATIC SPEED CHANGE DEVICE
Hollis K. Gleasman, Elmira, N.Y., assignor to The Bendix Corporation, Elmira, N.Y., a corporation of Delaware
Filed June 10, 1964, Ser. No. 374,080
6 Claims. (Cl. 74—750)

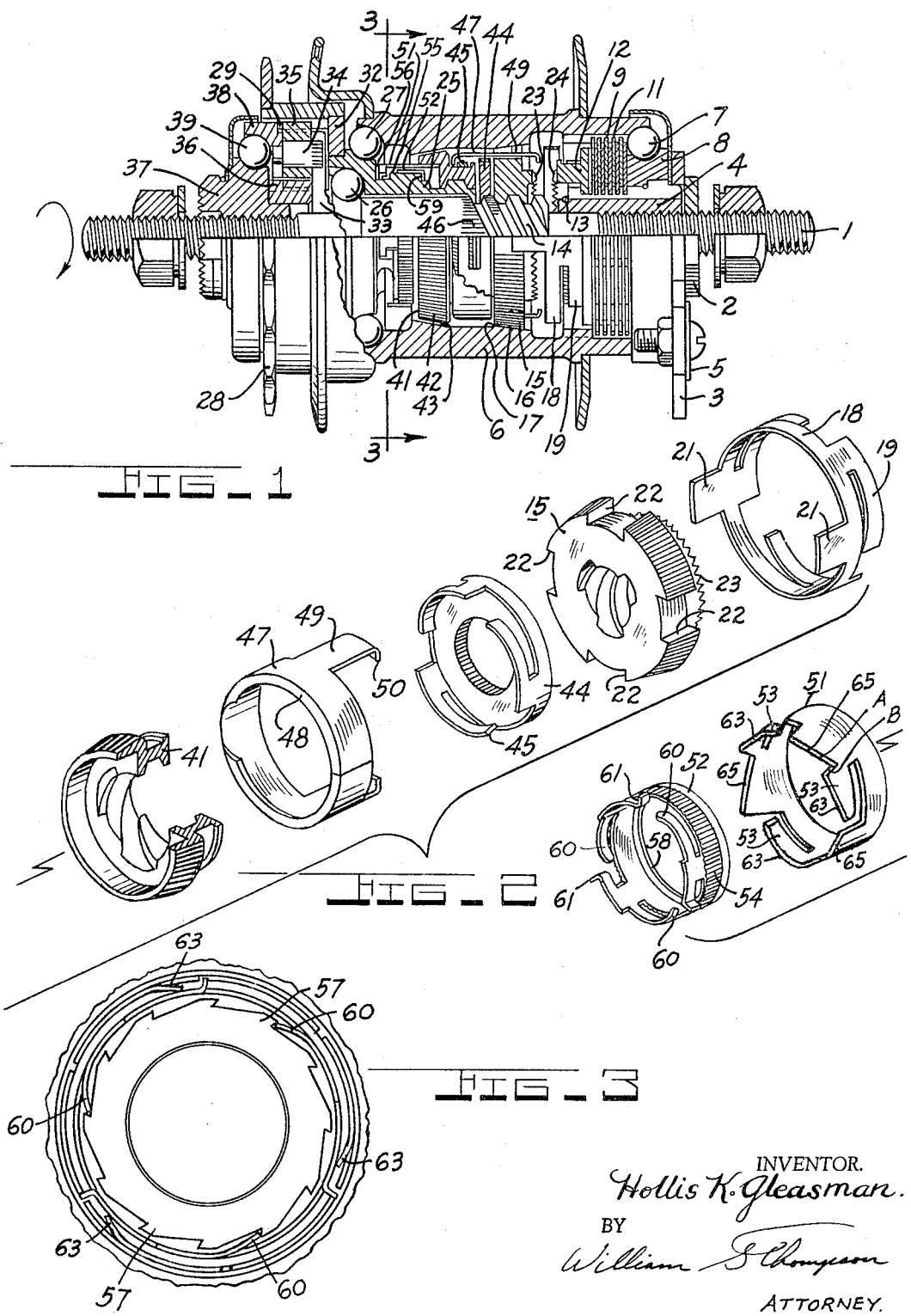

The present invention relates to a semi-automatic speed change device and more particularly to an improvement in retarder mechanism for a speed change device used to shift from one gear ratio to another on slight reverse rotation of a driving member and adopted for use in a bicycle hub or the like.

The present invention is an improvement in retarder mechanism as utilized in prior art semi-automatic speed change devices as for example described in commonly assigned U.S. Patent 2,972,908 issued February 28, 1961 of which I am a co-inventor.

In these prior art devices, speed change mechanism consists of a high speed screw shaft and a low speed screw shaft each having threaded thereon high and low speed clutch engaging members or nuts respectively for selectively drivably engaging a hub member. Selective engagement of the high and low speed clutch nuts is accomplished by axial translation of the clutch nut into and out of engagement with conforming surfaces formed in the hub. In order to obtain axial translation of the nut members, retarding means are employed which frictionally engage a fixed member to the clutch nuts. As two axially spaced clutch nuts are utilized, the retarding means described in the referenced patent consists of two friction spring members connected in series, one of which frictionally connects the low speed nut with the fixed member, and the other of which frictionally connects the high speed nut to the low speed nut.

When connected in series, the frictional force between high and low speed nuts must be less than between low speed nut and fixed member, thus requiring close control of relative friction values. Moreover, it is desirable to reduce, insofar as possible, the low speed nut friction force which acts as a drag which must be overcome by pedalling effort when the device is being propelled.

It is an object of the present invention therefore to provide retarding means for a semi-automatic two speed change device wherein the high speed retarder is separately anchored from the low speed retarder.

It is another object of the present invention to provide a high speed retarder clutch nut mechanism mounted on the low speed screw shaft.

It is a still further object of the present invention to provide retarding mechanism for high and low speed clutch nuts wherein the retarding friction values for each nut is independent of the other.

Further objects and advantages will be apparent from the following description taken in conjunction with the accompanying drawing in which:

FIGURE 1 is a side elevation, partly broken away and in section, of a preferred embodiment of the invention;

FIGURE 2 is an exploded view in perspective showing the details of retarder mechanism, clutch nuts, anti-lock means, and indexing means; and, FIGURE 3 is a section view taken substantially on the plane of line 3—3 of FIGURE 1.

In FIGURE 1 of the drawings, there is illustrated a stationary axle 1 adapted to be mounted in the rear fork of a bicycle or the like. A brake anchor sleeve 2 is threaded on the axle 1 and held from rotation by anchor arm 3 nonrotatably mounted thereof, retained by clamping nut 4 and prevented from rotation by a clip 5 adapted to be attached to a frame member of a vehicle in a conventional manner.

A hub 6 is rotatably mounted on the anchor sleeve 2 by means of bearings 7 seated on a bearing cone 8 fixedly mounted on the anchor sleeve. Brake discs 9 and 11 are splined alternately to the hub 6 and anchor sleeve 2 and are arranged to be pressed against the bearing cone 8 by means of a brake actuating pressure plate member 12 splined on the anchor sleeve and loosely retained thereon by a lock ring 13. A low speed screw shaft 14 is rotatably mounted on the axle 1 and has a low speed clutch engaging member or nut 15 threaded thereon having a conical clutch surface 16 adapted to engage the conforming surface 17 formed in the interior of the hub 6. A low speed nut retarder sleeve 18 (FIGURES 1 and 2) having arms 19 bearing frictionally on the periphery of the brake actuating member 12, has a pair of axially extending fingers 21 slidably engaging in the axially extending slots 22 formed in the periphery of the low speed clutch nut 15 to form a spline connection therewith. Rotation of the low speed screw shaft 14 in a forward direction as indicated by the arrow in FIGURE 1 thus causes said clutch nut to engage and drive the hub, while backward rotation of said screw shaft causes the clutch nut to engage and operate the brake actuating member 12 to compress the brake discs 9 and 11. The engaging faces of the low speed clutch nut 15 and the brake actuating member 12 are provided with dentils 23, 24 respectively, in order to prevent relative rotation when in engagement.

A high speed screw shaft 25 is rotatably mounted on the low speed screw shaft 14 by means of bearings 26, and in turn rotatably supports the adjacent end of the hub 6 by means of bearings 27. A driving member or sprocket 28 includes a ring gear 29 fixedly mounted thereon, and is united with high speed screw shaft 25 by a ring member 32 rigidly connected thereto and mounted on the adjacent end of the high speed screw shaft by any suitable means such as brazing.

A planet carrier ring 33 is fixedly mounted on the end of the low speed screw shaft 14 and has a plurality of pintles 34 fixedly mounted therein and serving as bearings for the planet pinions 35 which engage the ring gear 29. Said pinions also mesh with a sun gear 36 rigidly mounted on a stationary bearing cone member 37 which is threaded on axle 1. A bearing cup member 38 receives and supports the ends of pintles 34 and is rotatably mounted on the cone member 37 by means of bearings 39. A high speed clutch engaging member or nut member 41 is threaded on the high speed screw shaft 25 and has a conical periphery 42 adapted to be moved in and out of clutching engagement with the conforming surface 43 formed in the interior of the hub 6. A high speed retarder member 44 is provided with arms 45 bearing frictionally on the high speed clutch nut 41 and has a splined connection 46 with the low speed screw shaft 14. Radially outwardly of the high speed retarder member 44 there is arranged an anti-lock sleeve member 47 having a radially inwardly extending flange 48 loosely engaging high speed clutch nut member 41. Anti-lock sleeve member 47 includes a pair of axially extending arms 49 which extend through one pair of grooves 22 of the low speed clutch nut 15 and contain at their axially outermost ends radially extending abutments 50.

The function of the anti-lock sleeve member 47 is to limit the degree of separation between high speed clutch nut 41 and low speed clutch nut 15 to prevent inadverting locking or braking action. For example, if hub 6 is rotated backwardly, as for example, when a bicycle is walked backwards, when the high speed clutch nut 41 is engaged, the low speed screw shaft 14 will be rotated in the braking direction. The transmission of rotary motion in this example is from hub 6 through high speed clutch nut 41, high speed screw shaft 25, pinions 35, sun gear 36 to low speed screw shaft 14. This motion operates to translate low speed clutch nut 15 rightwardly in the brake engaging direction and, if unrestrained, the brake would be applied after a certain predetermined backward rotation of the hub. To avoid inadvertent brake application, abutments 50 limit the rightward travel of low speed clutch 15 so that it is unable to actuate the brakes when high speed clutch nut 41 is engaged with hub 6. This does not, of course, interfere with normal brake actuation when the operator back pedals sprocket 28 as backward rotation applied at this point causes the high speed clutch nut 41 to move to the right, thus also moving abutments 50 sufficiently far to enable normal braking engagement.

A selector spring sleeve 51 is rigidly mounted in a counterbore in the end of high speed clutch nut 41, or if desired, clutch nut 41 and sleeve 51 may be fabricated as one integral part.

Radially inwardly of sleeve 51, there is disposed an abutment ring 52 slidably mounted on the high speed screw shaft 25. Spring arms 53 on the selector spring sleeve bear on the knurled periphery 54 of the indexing and abutment ring 52 to form a friction connection therebetween.

The high speed screw shaft 25 has a smooth portion 55 on which the abutment ring 52 rotates freely, and has a circumferential channel 56 formed therein adjacent said smooth portion. A plurality of ratchet teeth 57 (FIGURE 3) are formed in the bottom of said channel. The indexing and abutment ring 52 is provided at one end with an inwardly bent flange 58 against a shoulder 59 on the high speed screw shaft of the abutment ring 52. This relative motion will displace pawls 60 one tooth clockwise from the position illustrated in FIGURE 3.

It will be noted that there are twice as many ratchet teeth 57 as there are inclined segments 63 and 65 (12 to 6) so that lugs 61 are indexed one-half of an inclined segment 63 or 65. If before shifting, the device in high gear with high speed clutch nut 41 engaged with hub 6, lug 61 of abutment ring 52 is positioned relative to spring sleeve 51 approximately at the point A of inclined segment 65. If now by back pedalling, pawls 60 are indexed one tooth forward on ratchet teeth 57, lug 61 will be indexed one-half of an inclined segment 65. On forward pedalling, lug 61 will then strike the stop 13 of spring sleeve 51 preventing engagement of the high speed clutch nut. Thus, low speed clutch nut 15 will drivably engage the hub. A second back-pedalling operation will index lug 61 one-half tooth more or back to the point 13 where it does not interfere with the movement of spring sleeve 51 allowing the high speed clutch nut to engage hub 6. Thus, each successive back-pedalling motion will alternately select high or low speed drive.

It will be observed in the embodiment shown that the high speed retarder 44 is physically separate from low speed retarder 18 such that the frictional forces of these two retarding devices are not interdependent. Thus, the frictional force transmitted by arms 19 of the low speed retarder may be designed sufficiently low without regard to the frictional engaging force of high speed retarder 44 to cause a minimum dragging force on the low speed clutch nut 15.

Although certain structure has been shown and described in detail, it will be understood that changes may be made in the design and arrangement of parts without departing from the spirit of the invention.

I claim:

1. In a two-speed hub for velocipedes and the like comprised of: a fixed axle, a low-speed threaded screw shaft journalled thereon, a high-speed threaded screw shaft rotatably mounted on the low-speed shaft, a hub rotatably mounted relative to the fixed axle, a driving member, means for rotating both shafts from the driving member at different gear ratios, a low-speed clutch threadedly engaging said low-speed shaft for movement into and out of clutching engagement with said hub, a high-speed clutch threadedly engaging said high-speed shaft for movement into and out of clutching engagement with the hub, low-speed clutch retarder means for frictionally resisting rotation of said low-speed clutch, a high-speed clutch retarder member connected to said low-speed screw shaft for rotation therewith, said high-speed clutch retarder member frictionally engaging said high-speed clutch to resist relative rotation of said high-speed clutch greater than the speed of rotation of said low-speed screw shaft, and selector means selectively permitting and blocking drivable engagement of said high-speed clutch with said hub in response to operator control.

2. A two-speed hub as set forth in claim 1 in which said high-speed clutch retarder member is splined to said low-speed screw shaft to permit relative axial movement between said high-speed retarder member and said low-speed shaft.

3. A two-speed hub as set forth in claim 1 wherein said high-speed clutch contains a cylindrical extension, said high-speed retarder member includes a plurality of arcuate arms frictionally engaging said cylindrical extension to prevent rotation in one direction of movement of said high-speed clutch at speeds greater than said high-speed retarder member.

4. In a two-speed rear hub and brake for velocipedes comprising: a fixed axle, a low-speed threaded screw shaft journalled thereon, a high-speed threaded screw shaft rotatably mounted on the low-speed shaft, a hub rotatably mounted relative to the fixed axle, a driving member, a planetary gear mechanism interconnecting said driving member and said shafts for rotating both said shafts at different speeds, a low-speed clutch threadedly engaging said low-speed shaft for movement into and out of clutching engagement with said hub, a high-speed clutch threadedly engaging said high-speed shaft for movement into and out of clutching engagement with the hub, a friction brake device within said hub including a non-rotatable axially slidable actuating pressure plate member, low-speed retarder means frictionally engaging said non-rotatable pressure plate member, said low-speed retarder means having axially extending arms having splined engagement with said low-speed clutch to provide frictional resistance against rotation acting on said low speed clutch, high-speed retarder means splined to said low-speed shaft for rotation therewith, said high-speed clutch retarder member frictionally engaging said high-speed clutch to resist relative rotation of said high-speed clutch greater than the speed of rotation of said low-speed shaft, and selector means selectively permitting and blocking drivable engagement of said high-speed clutch with said hub in response to operator control.

5. In a two-speed hub and brake as claimed in claim 4 wherein said high-speed clutch contains a cylindrical extension, an anti-lock sleeve member loosely connected to said cylindrical extension having axially extending arms through said low-speed clutch, said axially extending arms having radially extending abutment extensions operative to limit the axial travel of said low-speed clutch.

6. In a two-speed rear hub and brake as claimed in claim 5 including dentile engagement means formed on said low-speed clutch and said pressure plate member to transfer a brake applying force from said low speed clutch to said friction brake device.

References Cited by the Examiner
UNITED STATES PATENTS

| | | | |
|---|---|---|---|
| 942,220 | 12/1909 | Rockwell | 74—750 |
| 2,993,575 | 7/1961 | Hood | 74—750 X |

DAVID J. WILLIAMOWSKY, *Primary Examiner.*

J. R. BENEFIEL, *Assistant Examiner.*